(12) United States Patent
Mizuno et al.

(10) Patent No.: US 10,215,071 B2
(45) Date of Patent: Feb. 26, 2019

(54) EXHAUST GAS AFTERTREATMENT UNIT AND WORK VEHICLE

(71) Applicant: KOMATSU LTD., Tokyo (JP)

(72) Inventors: Hiroyuki Mizuno, Uji (JP); Satoru Ide, Ibaraki (JP); Daisuke Kodani, Takatsuki (JP)

(73) Assignee: KOMATSU LTD., Tokyo (JP)

( * ) Notice: Subject to any disclaimer, the term of this patent is extended or adjusted under 35 U.S.C. 154(b) by 145 days.

(21) Appl. No.: 15/124,494

(22) PCT Filed: Apr. 28, 2016

(86) PCT No.: PCT/JP2016/063500
§ 371 (c)(1),
(2) Date: Sep. 8, 2016

(87) PCT Pub. No.: WO2017/187640
PCT Pub. Date: Nov. 2, 2017

(65) Prior Publication Data
US 2018/0106176 A1  Apr. 19, 2018

(51) Int. Cl.
*F01N 3/20* (2006.01)
*F01P 3/12* (2006.01)
(Continued)

(52) U.S. Cl.
CPC ........... *F01N 3/2066* (2013.01); *B01D 53/90* (2013.01); *B01D 53/9418* (2013.01);
(Continued)

(58) Field of Classification Search
CPC ..... F02F 9/00; F01N 3/08; F01P 11/00; F01P 3/12; B01D 2251/2067; B01D 53/90; B01D 53/9409
(Continued)

(56) References Cited

U.S. PATENT DOCUMENTS

| 2010/0242439 A1* | 9/2010 | Domon | B01D 53/9431 60/274 |
| 2011/0120085 A1* | 5/2011 | Saito | F01N 3/0211 60/272 |

(Continued)

FOREIGN PATENT DOCUMENTS

| JP | 2007-9752 A | 1/2007 |
| JP | 2014-5786 A | 1/2014 |

(Continued)

OTHER PUBLICATIONS

International Search Report for the corresponding international application No. PCT/JP2016/063500, dated Jul. 26, 2016.

*Primary Examiner* — Audrey K Bradley
*Assistant Examiner* — Dapinder Singh
(74) *Attorney, Agent, or Firm* — Global IP Counselors, LLP

(57) ABSTRACT

An exhaust gas aftertreatment unit includes a selective catalytic reduction device that treats engine exhaust gas, a connecting pipe that guides the engine exhaust gas to the reduction device, a reducing agent injection device disposed on the connecting pipe to inject a reducing agent into the exhaust gas, and a cooling water flowpath that guides cooling water to an internal flowpath of the injection device. The cooling water path includes a first flowpath joined with the internal flowpath, second and third flowpaths branching off from the first flowpath, and a branching point where the first flowpath branches into the second flowpath and the third flowpath is positioned higher than a connecting portion of the injection device and the first flowpath. The third flowpath extends further upward than the second flowpath from the branching point. The second and third flowpaths merge on an opposite side of the branching point.

8 Claims, 8 Drawing Sheets

(51) Int. Cl.
*B01D 53/90* (2006.01)
*F01P 11/00* (2006.01)
*B01D 53/94* (2006.01)
*E02F 9/08* (2006.01)

(52) U.S. Cl.
CPC .............. *E02F 9/0866* (2013.01); *F01P 3/12* (2013.01); *F01P 11/00* (2013.01); *B01D 53/9409* (2013.01); *B01D 2251/2067* (2013.01); *F01N 2610/11* (2013.01); *F01N 2610/1453* (2013.01); *F01P 2060/16* (2013.01)

(58) Field of Classification Search
USPC .......................... 60/274, 286, 295, 299–301
See application file for complete search history.

(56) References Cited

U.S. PATENT DOCUMENTS

| | | | | |
|---|---|---|---|---|
| 2013/0081377 | A1* | 4/2013 | Burger | F01N 3/2066 60/273 |
| 2013/0186073 | A1* | 7/2013 | Onodera | F01N 3/208 60/277 |
| 2013/0283769 | A1* | 10/2013 | Watanabe | F01N 3/208 60/274 |
| 2014/0245722 | A1* | 9/2014 | Naik | F01N 3/2006 60/286 |
| 2014/0290222 | A1 | 10/2014 | Sawada et al. | |
| 2015/0078967 | A1 | 3/2015 | Nakagami et al. | |
| 2015/0144305 | A1 | 5/2015 | Kowada | |
| 2015/0211401 | A1 | 7/2015 | Kamada | |

FOREIGN PATENT DOCUMENTS

| | | |
|---|---|---|
| JP | 5546694 B1 | 7/2014 |
| JP | 2015-137635 A | 7/2015 |
| WO | 2014/141478 A1 | 9/2014 |
| WO | 2014/141513 A1 | 9/2014 |
| WO | 2014/1414478 A1 | 9/2014 |

* cited by examiner

EXHAUST GAS AFTERTREATMENT UNIT AND WORK VEHICLE

CROSS-REFERENCE TO RELATED APPLICATIONS

This application is a U.S. National stage application of International Application No. PCT/JP2016/063500, filed on Apr. 28, 2016.

BACKGROUND

Field of the Invention

The present invention relates to an exhaust gas aftertreatment unit and a work vehicle.

Background Information

Conventionally, an exhaust gas aftertreatment unit for purifying nitrogen oxides included in the exhaust gas from a diesel engine has been provided on a work vehicle (see Japanese Patent No. 5546694 for example). The exhaust gas aftertreatment unit has a selective catalytic reduction device, a reducing agent injection device, and a cooling water path. The selective catalytic reduction device reduces nitrogen oxides in the exhaust gas. The reducing agent injection device injects a reducing agent into the exhaust gas flowing onto the selective catalytic reduction device. The cooling water path supplies cooling water to the reducing agent injection device for cooling the reducing agent injection device that is heated by the engine and the exhaust gas.

In order to cool the reducing agent injection device after the engine has stopped, Japanese Patent No. 5546694 proposes providing a convection section that extends upward from the reducing agent injection device in the cooling water path.

SUMMARY

However, after the engine has stopped, water vapor from the cooling water heated by the hot reducing agent injection device is produced and may mix with air inside the cooling water path. In this case, the replenishment of cooling water to the reducing agent injection device is suppressed and there is a concern that the reducing agent injection device cannot be cooled efficiently.

Taking the above condition into consideration, an object of the present invention is to provide an exhaust gas aftertreatment unit and a work vehicle that is able to improve the replenishing performance of the cooling water to the reducing agent injection device.

An exhaust gas aftertreatment unit according to a first aspect of the present invention is provided with a selective catalytic reduction device, a connecting pipe, a reducing agent injection device, and a cooling water path. The selective catalytic reduction device treats exhaust gas from an engine. The connecting pipe guides the exhaust gas from the engine to the selective catalytic reduction device. The reducing agent injection device is disposed on the connecting pipe and injects a reducing agent into the exhaust gas supplied to the selective catalytic reduction device. The cooling water path guides cooling water for cooling the reducing agent injection device to the reducing agent injection device. The reducing agent injection device has an internal flowpath through which the cooling water flows. The cooling water path includes a first flowpath joined with the internal flowpath of the reducing agent injection device, and a second flowpath and a third flowpath which branch off from the first flowpath. A branching point where the first flowpath branches into the second flowpath and the third flowpath is positioned higher than a connecting portion of the reducing agent injection device and the first flowpath. The third flowpath extends further upward than the second flowpath from the branching point. The second flowpath and the third flowpath merge on the opposite side of the branching point.

According to the exhaust gas aftertreatment unit as in the first aspect of the present invention, because water vapor produced in the internal flowpath of the reducing agent injection device after the engine has stopped is exhausted from the first flowpath to the third flowpath, water vapor staying in the internal flowpath of the reducing agent injection device and the first flowpath can be suppressed. As a result, because the cooling water can be supplied smoothly from the second flowpath through the first flowpath into the internal flowpath of the reducing agent injection device, the replenishment performance of the cooling water to the reducing agent injection device can be improved.

The exhaust gas aftertreatment unit according to a second aspect of the present invention is related to the first aspect, and the cooling water path has a tank for temporarily storing the cooling water. The second flowpath and the third flowpath are connected to the tank.

According to the exhaust gas aftertreatment unit as in the second aspect of the present invention, cooling water stored in the tank while the engine is driving can be supplied to the reducing agent injection device after the engine has stopped. Therefore, the supply amount of the cooling water to the reducing agent injection device after the engine has stopped can be increased.

The exhaust gas aftertreatment unit according to the third aspect of the present invention is related to the second aspect, and the second flowpath extends upward from the branching point.

According to the exhaust gas aftertreatment unit as in the third aspect of the present invention, the cooling water stored in the tank can flow smoothly from the second flowpath to the first flowpath due to the self-weight of the cooling water.

The exhaust gas aftertreatment unit according to a fourth aspect of the present invention is related to the second or third aspect, and the third flowpath is connected to the tank at a position higher than the second flowpath.

According to the exhaust gas aftertreatment unit as in the fourth aspect of the present invention, the cooling water is made to flow from the tank to the second flowpath while the water vapor generated in the internal flowpath of the reducing agent injection device is discharged from the third flowpath to the tank. Therefore, the cooling water can be made to flow smoothly from the second flowpath while suppressing the reverse flow of the cooling water toward the third flowpath.

The exhaust gas aftertreatment unit according to a fifth aspect of the present invention is related to the second to fourth aspects, and the cooling water path has a fourth flowpath connected to the tank and to a cooling water pump. The fourth flowpath is connected to the tank at a position higher than a middle of the tank in a vertical direction.

According to the exhaust gas aftertreatment unit as in the fifth aspect of the present invention, a greater amount of cooling water can be stored in the tank in comparison to when the fourth flowpath is connected at a position lower than the middle of the storage tank 29.

The exhaust gas aftertreatment unit according to a sixth aspect of the present invention is related to the first to fifth aspects, and the first flowpath is shorter than the third flowpath.

According to the exhaust gas aftertreatment unit as in the sixth aspect of the present invention, water vapor generated in the internal flowpath of the reducing agent injection device can be exhausted smoothly from the third flowpath because the flowpath length of the first flowpath can be made relatively smaller.

The exhaust gas aftertreatment unit according to a seventh aspect of the present invention is related to the first to sixth aspects, and the second flowpath is thicker than the third flowpath.

According to the exhaust gas aftertreatment unit as in the seventh aspect of the present invention, the amount of cooling water supplied to the reducing agent injection device after the engine has stopped can be increased because a larger amount of the cooling water can remain in the second flowpath when the engine has stopped.

A work vehicle according to an eighth aspect of the present invention is provided with a work implement, an engine, and the exhaust gas aftertreatment unit according to any of the first to seventh aspects.

Effects of Invention

According to the present invention, a work vehicle and an exhaust gas aftertreatment unit that is able to improve the replenishing performance of the cooling water to the reducing agent injection device can be provided.

DETAILED DESCRIPTION OF EMBODIMENT(S)

Configuration of Hydraulic Excavator 100

Figure 1:
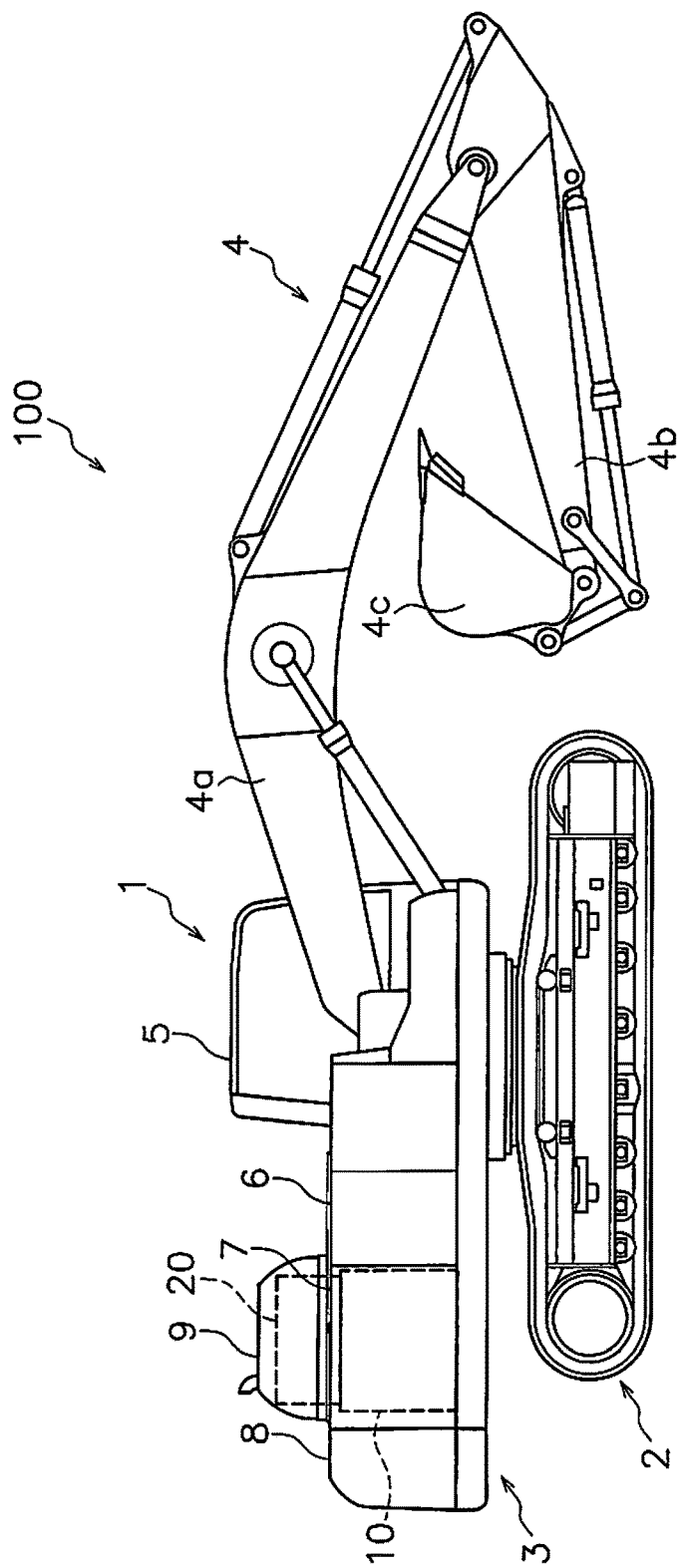
FIG. 1 is a side view of a hydraulic excavator.

FIG. 1 is a side view of a hydraulic excavator 100. In the following explanation, "front," "rear," "left," and "right" refer to directions based on looking forward from the operator's seat. "Vehicle width direction" and "left-right direction" have the same meaning.

The hydraulic excavator 100 is an example of a work vehicle according to the present embodiment. The hydraulic excavator 100 is equipped with a vehicle body 1 and a work implement 4.

The vehicle body 1 has a travel device 2 and a revolving body 3. The travel device 2 is driven by motive force from an engine 10. The revolving body 3 is mounted on the travel device 2. The revolving body 3 is provided in a rotatable manner with respect to the travel device 2.

The revolving body 3 has an operating cabin 5, an equipment room 6, an engine room 7, and a counterweight 8. The operating cabin 5 is disposed on the left side of the proximal end part of the work implement 4. The equipment room 6 is disposed to the rear of the operating cabin 5. A fuel tank and a hydraulic fluid tank and the like are housed inside the equipment room 6. The engine room 7 is disposed to the rear of the equipment room 6. The engine 10, an exhaust gas aftertreatment unit 20, and a below-mentioned radiator 12 (see FIG. 6) are housed in the engine room 7. The exhaust gas aftertreatment unit 20 is disposed above the engine 10 in the present embodiment. An engine hood 9 is disposed above the engine room 7. The counterweight 8 is disposed to the rear of the engine room 7.

The working equipment 4 is attached to the front part of the revolving body 3. The work implement 4 has a boom 4a, an arm 4b, and a bucket 4c. The work implement 4 is driven by hydraulic fluid.

Configuration of Exhaust Gas Aftertreatment Unit 20

Figure 2:
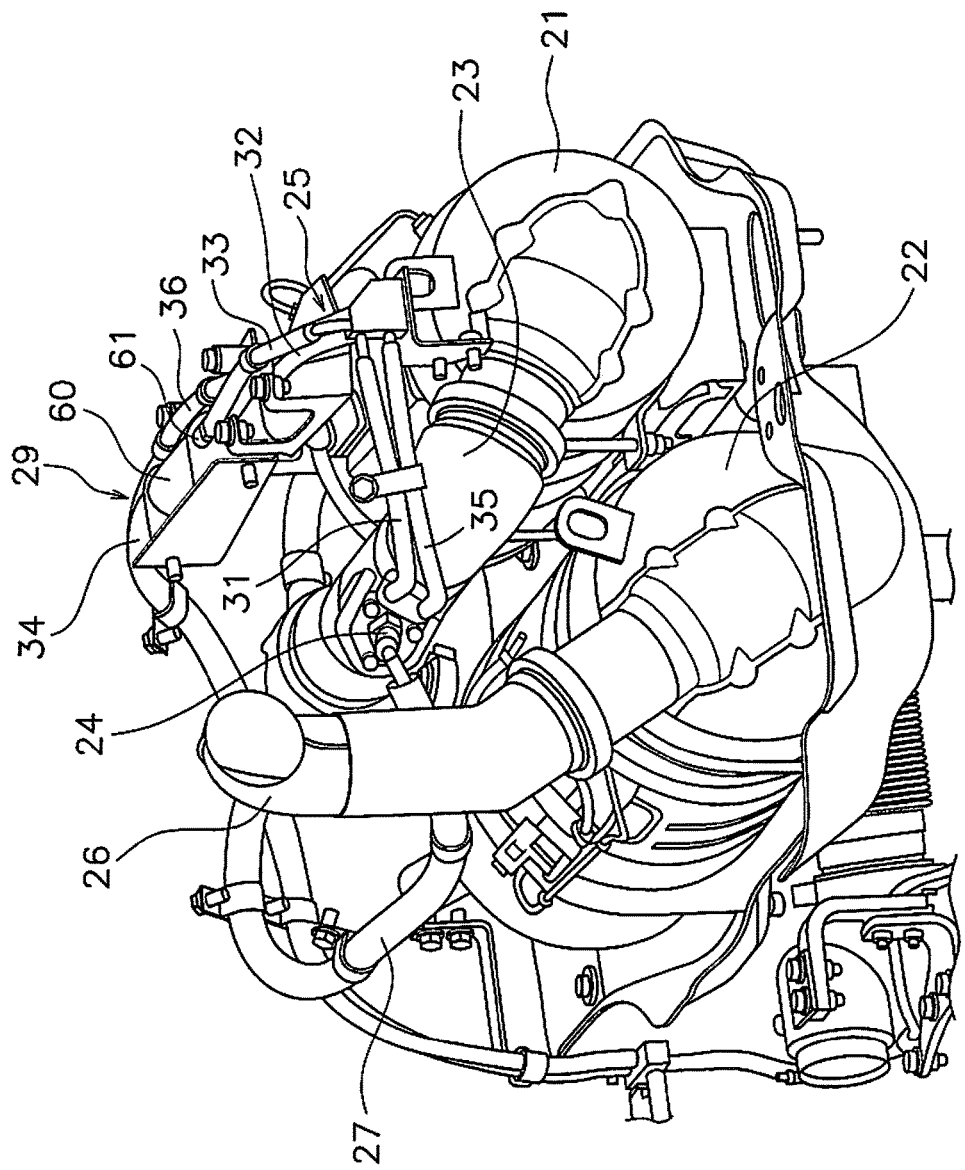
FIG. 2 is a perspective view of the exhaust gas aftertreatment unit.
Figure 3:
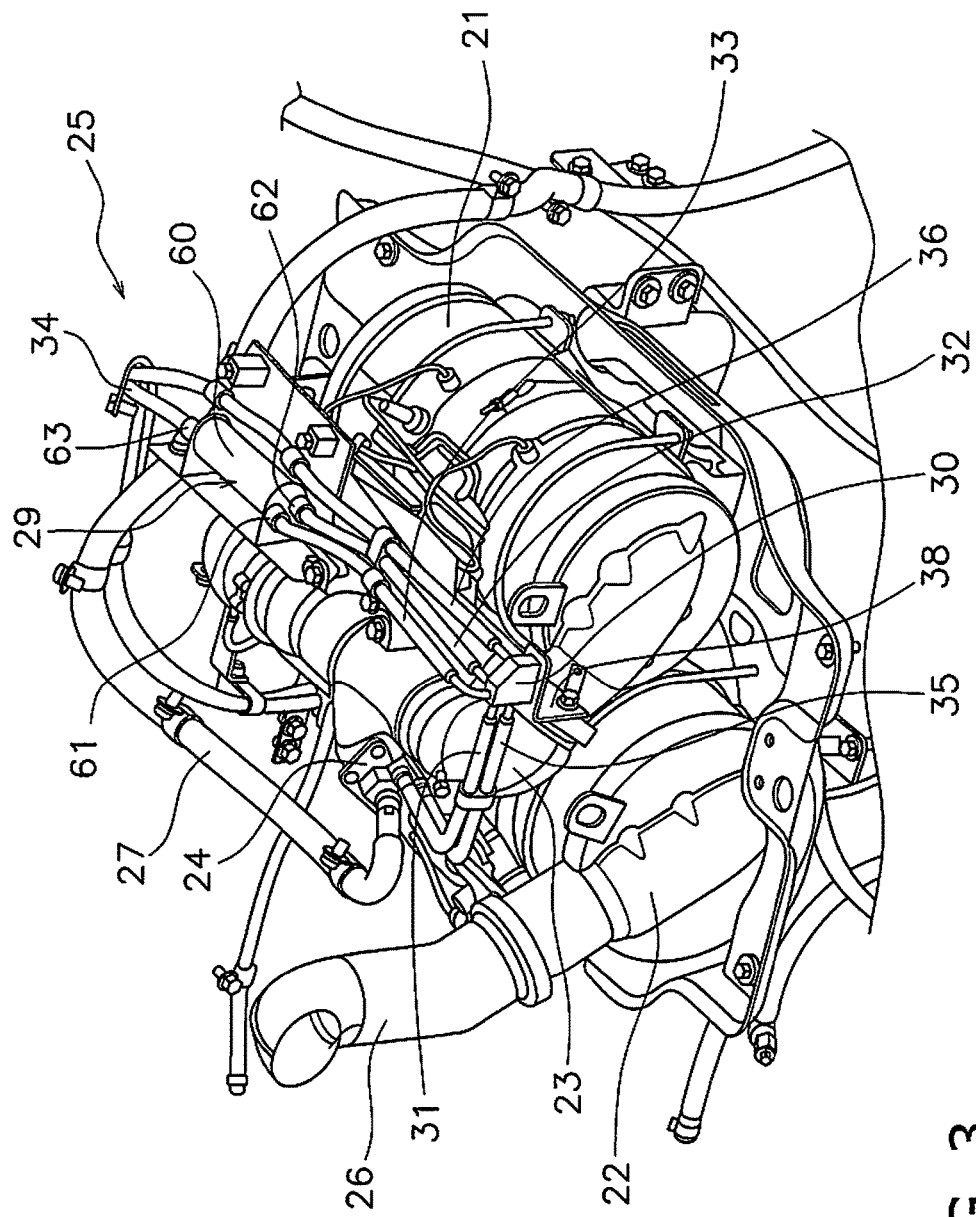
FIG. 3 is a perspective view of the exhaust gas aftertreatment unit.

FIG. 2 is a perspective view as seen diagonally from the left and the rear of the exhaust gas aftertreatment unit 20. FIG. 3 is a perspective view as seen diagonally from the right and the rear of the exhaust gas aftertreatment unit 20. The engine hood 9 is removed in FIGS. 2 and 3.

The exhaust gas aftertreatment unit 20 has a diesel particulate filtering device 21, a selective catalytic reduction device 22, a connecting pipe 23, a reducing agent injection device 24, and a cooling water path 25.

The diesel particulate filtering device 21 collects, in a filter, particulate matter included in the exhaust gas from the engine 10. The diesel particulate filtering device 21 burns the collected particulate matter with a heater provided with the filter. The exhaust gas from the engine 10 is guided into the diesel particulate filtering device 21 from the front part. The diesel particulate filtering device 21 has an approximately cylindrical shape. The diesel particulate filtering device 21 is disposed in the front-back direction in the present embodiment.

The selective catalytic reduction device 22 is disposed downstream of the diesel particulate filtering device 21. The exhaust gas that passes through the diesel particulate filtering device 21 is guided to the selective catalytic reduction device 22. The selective reduction catalytic device 22 treats the exhaust gas from the engine 10. Specifically, the selective catalytic reduction device 22 reduces the nitrogen oxides in the exhaust gas with ammonia. The selective catalytic reduction device 22 has an approximately cylindrical shape. The selective catalytic reduction device 22 is disposed in the front-back direction in the present embodiment. An exhaust pipe 26 which protrudes from the engine hood 9 (see FIG. 1) is connected to the rear part of the selective catalytic reduction device 22. Exhaust gas treated by the exhaust gas aftertreatment unit 20 is discharged to the outside from the exhaust pipe 26.

The connecting pipe 23 connects the diesel particulate filtering device 21 and the selective catalytic reduction device 22. The connecting pipe 23 guides the exhaust gas that passes through the diesel particulate filtering device 21 to the selective catalytic reduction device 22. The connecting pipe 23 is connected to a rear part of the diesel particulate filtering device 21 and to a front part of the selective catalytic reduction device 22. The entire connecting pipe 23 is formed in an S shape.

The reducing agent injection device 24 is disposed on the connecting pipe 23. A reducing agent supply pipe 27 is connected to the reducing agent injection device 24. The reducing agent supply pipe 27 supplies urea aqueous solution (example of the reducing agent) fed from an unillustrated urea aqueous tank to the reducing agent injection device 24. The reducing agent injection device 24 injects the urea aqueous solution into the exhaust gas supplied to the selective catalytic reduction device 22. The urea aqueous solution injected from the reducing agent injection device 24 is hydrolyzed to ammonia by the heat of the exhaust gas. The ammonia produced inside the connecting pipe 23 is guided along with the exhaust gas to the selective catalytic reduction device 22.

Figure 4:
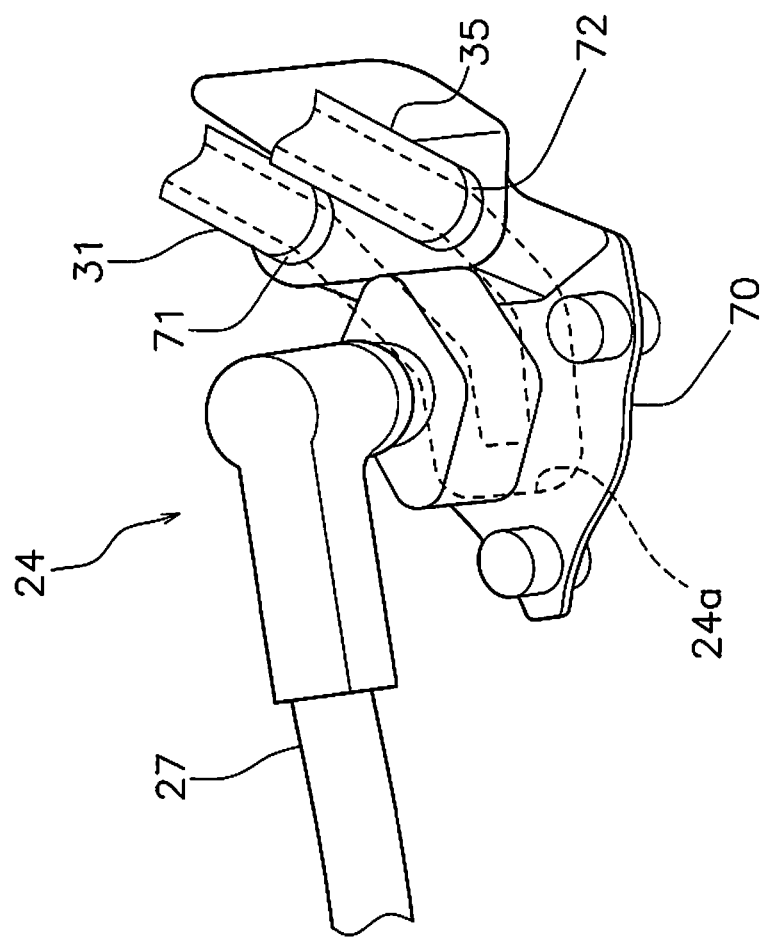
FIG. 4 is a perspective view of a reducing agent injection device.

FIG. 4 is a perspective view illustrating a configuration of the reducing agent injection device 24. The reducing agent injection device 24 has a main body part 70, a first injection device connecting part 71, and a second injection device connecting part 72. The reducing agent supply pipe 27 is connected to the main body part 70. An internal flowpath 24a is formed inside the main body part 70. The internal flowpath 24a allows communication between the first injection device connecting part 71 and the second injection device connecting part 72. A below-mentioned first pipe 31 is connected to the first injection device connecting part 71. A below-mentioned fifth pipe 35 is connected to the second injection device connecting part 72.

The reducing agent injection device 24 is heated by radiant heat from the engine 10 and the hot exhaust gas flowing through the connecting pipe 23 while the engine is driving. Moreover, the reducing agent injection device 24 is heated by radiant heat from the engine 10 and the hot exhaust gas that stays in the connecting pipe 23 even after the engine has stopped. While the engine 10 is driving, the reducing agent injection device 24 is latently cooled by cooling water supplied from the fifth pipe 35 to the internal flowpath 24a. After the engine 10 has stopped, the reducing agent injection device 24 is latently cooled by cooling water supplied from the first pipe 31 to the internal flowpath 24a.

The cooling water path 25 has a storage tank 29 (example of a tank), a branching block 30, the first pipe 31, a second pipe 32, a third pipe 33, a fourth pipe 34, the fifth pipe 35, and a sixth pipe 36.

The storage tank 29 is disposed above the diesel particulate filtering device 21. The storage tank 29 stores cooling water for cooling the reducing agent injection device 24 while the engine 10 is driving. The cooling water stored in the storage tank 29 is supplied to the reducing agent injection device 24 after the engine has stopped. The storage of the cooling water in the storage tank 29 and the supply of the cooling water from the storage tank 29 is described below.

The storage tank 29 has a main body part 60, a first tank connecting part 61, a second tank connecting part 62, and a third tank connecting part 63. In the present embodiment, the main body part 60 is formed in a cylindrical shape. The main body part 60 is disposed in the front-back direction. The first tank connecting part 61 and the second tank connecting part 62 are attached to the rear surface of the main body part 60. The first tank connecting part 61 is disposed higher than the second tank connecting part 62. The third tank connecting part 63 is attached to the front surface of the main body part 60. The third tank connecting part 63 is disposed higher than the middle of the storage tank 29 in the vertical direction.

The branching block 30 is disposed higher than the reducing agent injection device 24. In the present embodiment, the branching block 30 is disposed to the rear of the diesel particulate filtering device 21 and above the connecting pipe 23. The branching block 30 is fixed with a bracket 38. The bracket 38 is attached to the connecting pipe 23.

Figure 5:
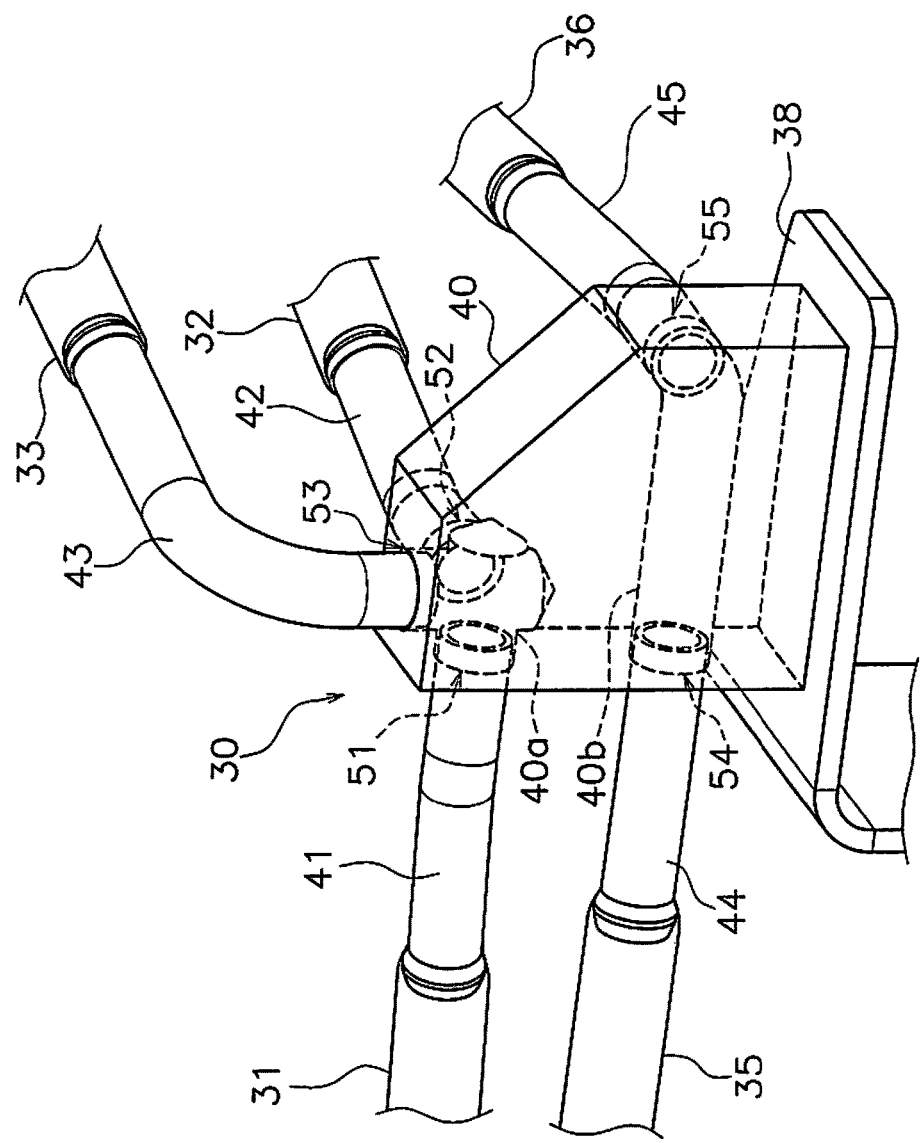
FIG. 5 is a perspective view of a branching block.

FIG. 5 is a perspective view of a configuration of the branching block 30. The branching block 30 has a main body part 40, a first branch connection part 41, a second branch connection part 42, a third branch connection part 43, a fourth connecting part 44, and a fifth connecting part 45.

The main body part 40 has a first internal flowpath 40a and a second internal flowpath 40b.

The first internal flowpath 40a is formed inside the main body part 40. The first internal flowpath 40a is formed in a trifurcated shape. The first internal flowpath 40a communicates with the first branch connection part 41, the second branch connection part 42, and the third branch connection part 43. The "branched pipe" which branches in three ways is configured by the first branch connection part 41, the second branch connection part 42, the third branch connection part 43, and the first internal flowpath 40a in the present embodiment.

The first internal flowpath 40a has a first opening 51, a second opening 52, and a third opening 53. The first opening 51 opens on the left surface of the main body part 40. The second opening 52 opens on the front surface of the main body part 40. The second opening 52 is positioned lower than the third opening 53. In the present embodiment, the second opening 52 is positioned at the same height as the first opening 51. The third opening 53 opens on the top surface of the main body part 40. The third opening 53 is positioned higher than the second opening 52. However, the heights of the openings may be changed as appropriate so long as the third opening 53 is positioned higher than the second opening 52. For example, the third opening 53 may be positioned higher than the second opening 52, and the second opening 52 may be positioned higher than the first opening 51. Moreover, the third opening 53 may be positioned at the same height as the first opening 51, and the second opening 52 may be positioned lower than the first opening 51.

The second internal flowpath 40b is formed inside the main body part 40. The second internal flowpath 40b is positioned lower than the first internal flowpath 40a. The second internal flowpath 40b is formed in an L-shape. The second internal flowpath 40b has a fourth opening 54 and a fifth opening 55. The fourth opening 54 opens on the left surface of the main body part 40 lower than the first opening 51. The fifth opening 55 opens on the front surface of the main body part 40 lower than the second opening 52. While the fourth opening 54 is positioned at the same height as the fifth opening 55 in the present embodiment, the heights of the openings may be changed as appropriate. The fifth opening 55 is preferably positioned higher than the fourth opening 54, but may also be positioned lower than the fourth opening 54.

The first branch connection part 41 is attached to the first opening 51. The first branch connection part 41 protrudes to the left from the left surface of the main body part 40. In the present embodiment, the first branch connection part 41 is disposed at a position higher than the second branch connection part 42.

The second branch connection part 42 is attached to the second opening 52. The second branch connection part 42 protrudes toward the front from the front surface of the main body part 40. The second branch connection part 42 is disposed at a position lower than the third branch connection part 43.

The third branch connection part 43 is attached to the third opening 53. The third branch connection part 43 protrudes upward from the top surface of the main body part 40. The third branch connection part 43 is formed in an L-shape. The third branch connection part 43 extends upward from the third opening 53 and then is curved to extend in an approximately horizontal direction. The third branch connection part 43 is disposed higher than the second branch connection part 42.

The heights of the first to third branch connection parts may be changed as appropriate so long as the third branch connection part 43 is disposed higher than the second branch connection part 42. For example, the third branch connection part 43 may be positioned higher than the second branch connection part 42, and the second branch connection part 42 may be positioned higher than the first branch connection part 41. Further, the third branch connection part 43 may be positioned at the same height as the first branch connection part 41, and the second branch connection part 42 may be positioned lower than the first branch connection part 41.

The fourth connecting part 44 is attached to the fourth opening 54. The fourth connecting part 44 protrudes to the left from the left surface of the main body part 40. The fourth connecting part 44 is disposed lower than the first branch connection part 41.

The fifth connecting part 45 is attached to the fifth opening 55. The fifth connecting part 45 protrudes toward the front from the front surface of the main body part 40. While the fourth connecting part 44 is disposed at the same height as the fifth connecting part 45 in the present embodiment, the heights of the fourth and fifth connecting parts may be changed as appropriate. The fifth opening 55 is preferably positioned higher than the fourth opening 54, but may also be positioned lower than the fourth opening 54.

One end part of the first pipe 31 is connected to the first injection device connecting part 71 of the reducing agent injection device 24 as illustrated in FIG. 4. The other end part of the first pipe 31 is connected to the first branch connection part 41 of the branching block 30 as illustrated in FIG. 5. The first pipe 31 joins with the third pipe 33 and the second pipe 32 via the first internal flowpath 40a. The first pipe 31 in the present embodiment is disposed higher than the fifth pipe 35.

One end part of the second pipe 32 is connected to the second tank connecting part 62 of the storage tank 29 as illustrated in FIG. 3. The other end part of the second pipe 32 is connected to the second branch connection part 42 of the branching block 30 as illustrated in FIG. 5. The second pipe 32 is disposed lower than the third pipe 33. The second pipe 32 is disposed in the front-back direction in the present embodiment.

One end part of the third pipe 33 is connected to the first tank connecting part 61 of the storage tank 29 as illustrated in FIG. 3. The other end part of the third pipe 33 is connected to the third branch connection part 43 of the branching block 30 as illustrated in FIG. 5. The third pipe 33 is disposed higher than the second pipe 32. The third pipe 33 is disposed in the front-back direction in the present embodiment.

One end part of the fourth pipe 34 is connected to the third tank connecting part 63 of the storage tank 29 as illustrated in FIG. 3. The other end part of the fourth pipe 34 is connected to a below-mentioned cooling water pump 11 (see FIG. 6). The fourth pipe 34 functions as an exhaust pipe for exhausting the cooling water from the storage tank 29 while the engine 10 is driving in the present embodiment.

One end part of the fifth pipe 35 is connected to the second injection device connecting part 72 of the reducing agent injection device 24 as illustrated in FIG. 4. The other end part of the fifth pipe 35 is connected to the fourth connecting part 44 of the branching block 30 as illustrated in FIG. 5. The fifth pipe 35 joins with the sixth pipe 36 via the second internal flowpath 40b. The fifth pipe 35 in the present embodiment is disposed along and lower than the first pipe 31.

One end part of the sixth pipe 36 is connected to the fifth connecting part 45 of the storage tank 29 as illustrated in FIG. 4. The other end part of the sixth pipe 36 is connected to the below-mentioned cooling water pump 11 (see FIG. 6). The sixth pipe 36 joins with the fifth pipe 35 via the second internal flowpath 40b.

Supply of Cooling Water to the Reducing Agent Injection Device 24

Figure 6:
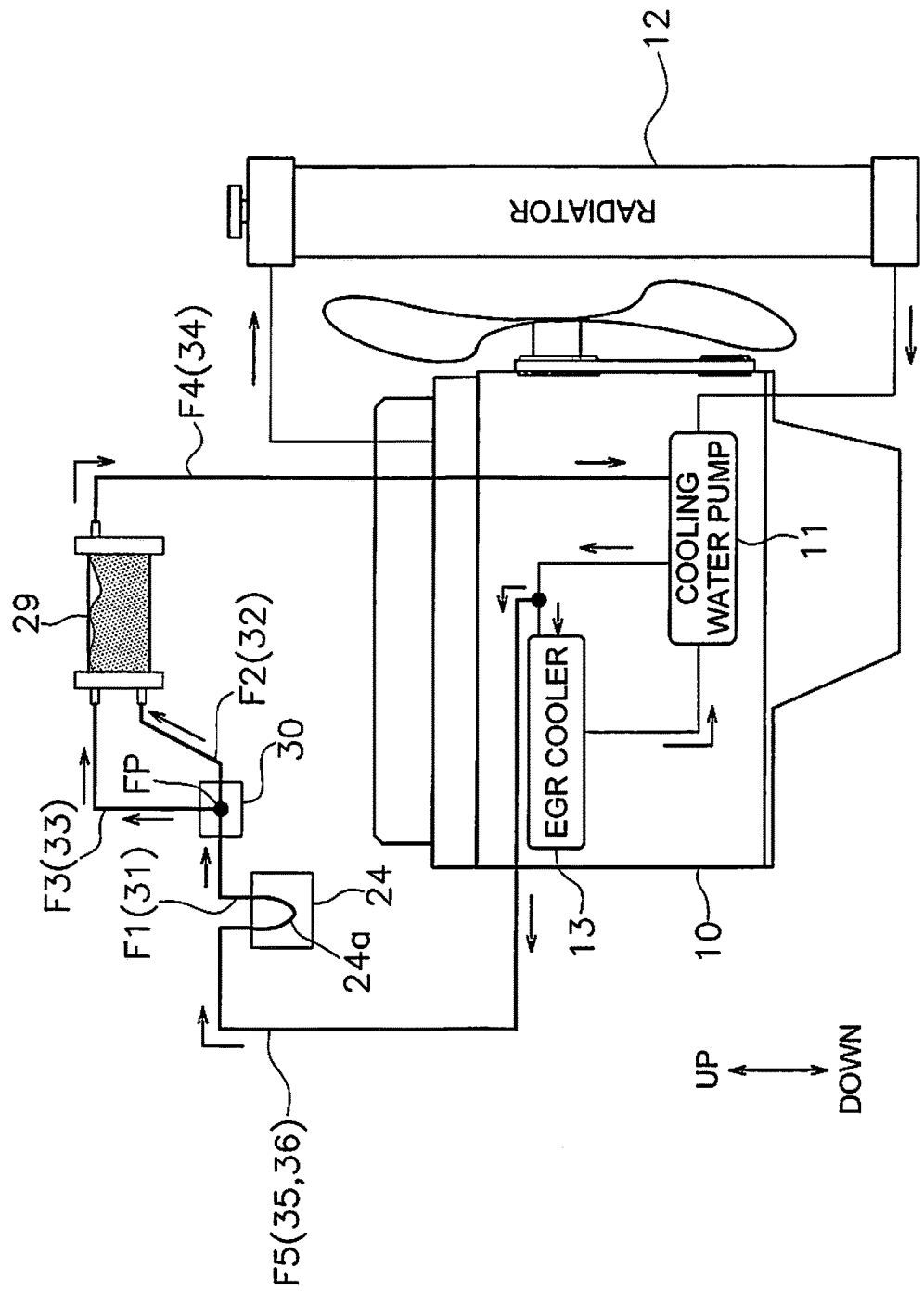
FIG. 6 is a schematic view for describing the supply of cooling water to the reducing agent injection device while the engine is driving.
Figure 7:
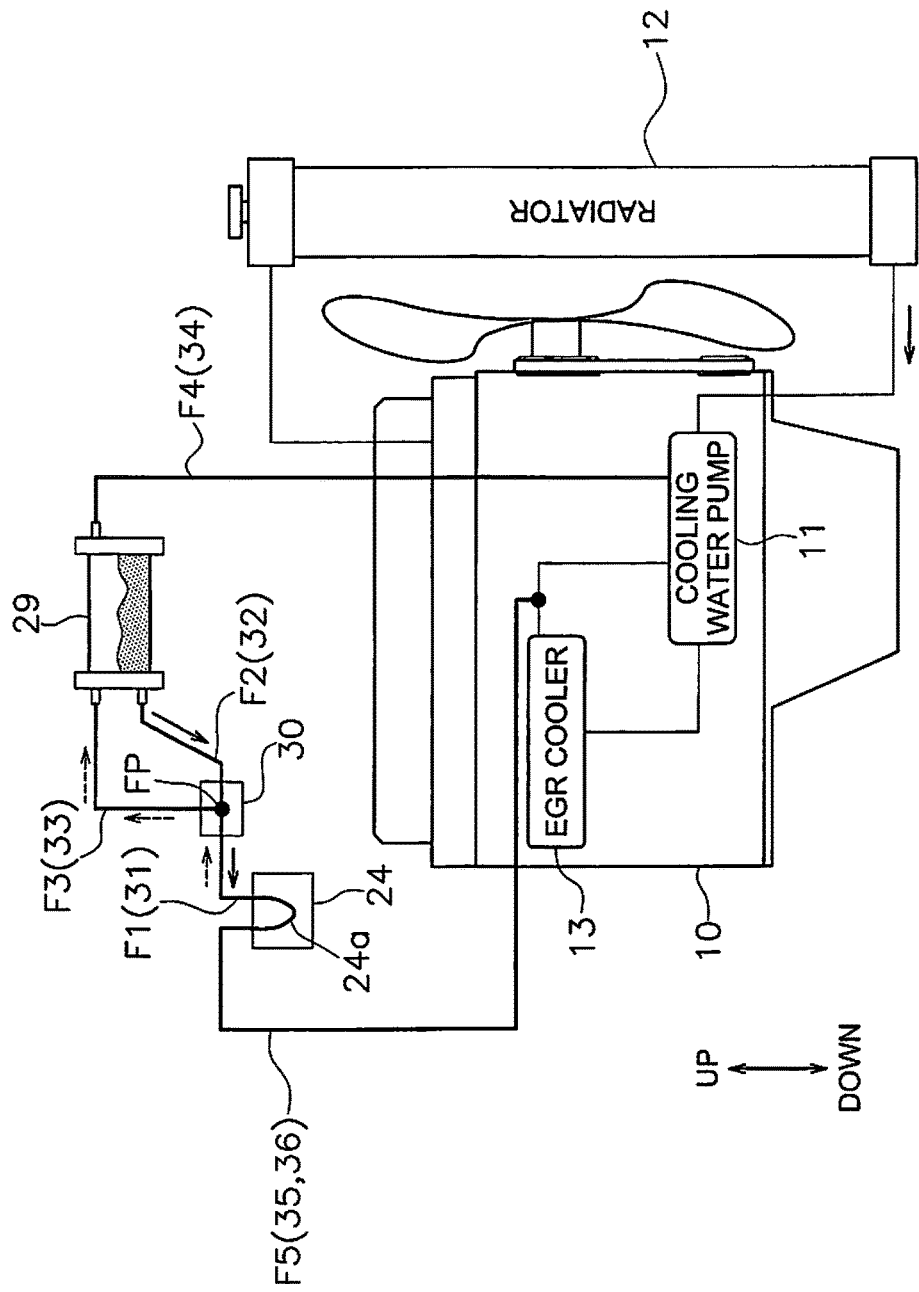
FIG. 7 is a schematic view for describing the supply of cooling water to the reducing agent injection device after the engine has stopped.

FIG. 6 is a schematic view for describing the supply of cooling water to the reducing agent injection device 24 while the engine 10 is driving. FIG. 7 is a schematic view for describing the supply of cooling water to the reducing agent injection device 24 after the engine 10 has stopped.

As illustrated in FIGS. 6 and 7, the cooling water pump 11, the radiator 12, and an EGR (exhaust gas recirculating device) cooler 13 are connected to the engine 10.

The cooling water pump 11 is connected to the crankshaft of the engine 10 and is driven in synchronization with the rotation of the crankshaft. The cooling water pump 11 pumps out cooling water while the engine 10 is driving. The cooling water pump 11 does not pump out cooling water after the engine 10 has stopped.

As illustrated in FIGS. 6 and 7, the cooling water path 25 has a first flowpath F1, a second flowpath F2, a third flowpath F3, a fourth flowpath F4, a fifth flowpath F5, the storage tank 29, and the internal flowpath 24a. The cooling water path 25 guides the cooling water for cooling the reducing agent injection device 24 to the reducing agent injection device 24.

The first flowpath F1 is formed inside the first pipe 31. The second flowpath F2 is formed inside the second pipe 32. The third flowpath F3 is formed inside the third pipe 33. The fourth flowpath F4 is formed inside the fourth pipe 34. The fifth flowpath F5 is formed inside the fifth pipe 35 and the sixth pipe 36. The internal flowpath 24a is formed inside the reducing agent injection device 24.

The first flowpath F1 joins with the internal flowpath 24a. The first flowpath F1 extends upward from the internal flowpath 24a. The first flowpath F1 branches into the second flowpath F2 and the third flowpath F3 at a branching point FP. The branching point FP is positioned higher than the connecting portion of the reducing agent injection device 24 and the first flowpath F1. The branching point FP is positioned lower than the connecting portion of the storage tank 29 and the second flowpath F2. Therefore, one end part of the first flowpath F1 provided in the branching point FP is positioned higher than the other end part of the first flowpath F1 that joins with the internal flowpath 24a of the reducing agent injection device 24. Further, the one end part of the first flowpath F1 provided in the branching point FP is positioned lower than the other end part of the second flowpath F2 connected to the storage tank 29. The first flowpath F1 is shorter than the third flowpath F3 in the present embodiment.

The second flowpath F2 extends upward from the branching point FP. The third flowpath F3 extends higher than the second flowpath F2 from the branching point FP. The third flowpath F3 extends to the branching point FP from a position higher than the second flowpath F2. The rising angle of the second flowpath F2 from the branching point FP is larger than the rising angle of the third flowpath F3 from the branching point FP. The rising angle is the angle formed by each flow path with respect to a horizontal line. While the second flowpath F2 in its entirety is disposed higher than the third flowpath F3, a portion of the second flowpath F2 may be disposed lower than the third flowpath F3. The second flowpath F2 in the present embodiment is thicker than the third flowpath F3. Therefore, the volume per unit length of the second flowpath F2 is greater than the volume per unit length of the third flowpath F3.

The second flowpath F2 and the third flowpath F3 merge on the opposite side of the branching point FP. The second flowpath F2 and the third flowpath F3 merge at the storage tank 29 in the present embodiment. Both the second flowpath F2 and the third flowpath F3 are connected to the storage tank 29. The third flowpath F3 is connected to the storage tank 29 at a position higher than the second flowpath F2.

The fourth flowpath F4 is connected to the storage tank 29. The fourth flowpath F4 is connected to the storage tank 29 at a position higher than the middle of the storage tank 29 in the vertical direction. The fourth flowpath F4 is connected to the storage tank 29 at a position higher than the second flowpath F2 in the present embodiment. The fourth flowpath F4 is connected to the storage tank 29 at a position at the same height as the third flowpath F3. The fourth flowpath F4 is connected to the cooling water pump 11.

The fifth flowpath F5 joins with the internal flowpath 24a on the opposite side of the first flowpath F1. The fifth flowpath F5 is connected to the cooling water pump 11.

The supply of the cooling water while the engine 10 is driving will be discussed next with reference to FIG. 6.

Most of the cooling water pumped out from the cooling water pump 11 is supplied to the EGR cooler 13 and a water jacket (not illustrated) formed inside the engine 10. The cooling water that has passed through the water jacket of the engine 10 passes through the radiator 12 and then returns to the cooling water pump 11. The cooling water that has passed through the EGR cooler 13 returns to the cooling water pump 11.

The remainder of the cooling water pumped out from the cooling water pump 11 passes through the fifth flowpath F5 and is supplied to the internal flowpath 24a of the reducing agent injection device 24. The reducing agent injection device 24 is latently cooled by the cooling water supplied to the internal flowpath 24a. The cooling water that has passed through the internal flowpath 24a of the reducing agent injection device 24 flows into the first flowpath F1. The cooling water that flows into the first flowpath F1 is divided into the second flowpath F2 and the third flowpath F3 at the branching point FP, and then flows into the storage tank 29 from the second flowpath F2 and the third flowpath F3. The cooling water is gradually stored in the storage tank 29 from the start of the driving of the engine 10. When the cooling water has filled the storage tank 29, the cooling water flows out from the fourth flowpath F4. The cooling water that flows out of the fourth flowpath F4 returns to the cooling water pump 11.

The supply of the cooling water after the engine 10 has stopped will be discussed next with reference to FIG. 7.

Because the cooling water pump 11 stops along with the engine 10, the supply of the cooling water from the cooling water pump 11 to the engine 10, the EGR cooler 13, and the reducing agent injection device 24 is also cut off.

As described above, the cooling water is stored in the storage tank 29 and the storage tank 29 is disposed higher than the reducing agent injection device 24 and the branching point FP. As a result, the cooling water stored in the storage tank 29 flows out from the second flowpath due to self-weight.

Conversely, the cooling water remaining in the internal flowpath 24a of the reducing agent injection device 24 vaporizes due to the latent heat and becomes water vapor. Consequently, the water vapor stays in the internal flowpath 24a and the first flowpath F1 which leads to an accumulation of air, whereby it becomes difficult for the cooling water to flow out of the storage tank 29 to the second flowpath F2.

In the present embodiment, the first flowpath F1 branches into the second flowpath F2 and the third flowpath F3 at the branching point FP. The water vapor generated in the internal flowpath 24a of the reducing agent injection device 24 passes from the first flowpath F1 through the third flowpath F3 and enters the storage tank 29. The cooling water stored in the storage tank 29 passes smoothly from the second flowpath F2 through the first flowpath F1 and is supplied to the internal flowpath 24a of the reducing agent injection device 24 accompanying the exhaust of the water vapor (so-called air bleeding) in this way. As a result, the reducing agent injection device 24 is latently cooled by the cooling water supplied to the internal flowpath 24a even after the engine 10 has stopped.

Characteristics (1) The exhaust gas aftertreatment unit 20 is provided with the cooling water path 25 that guides the cooling water for cooling the reducing agent injection device 24 to the reducing agent injection device 24. The cooling water path 25 includes the first flowpath F1 that joins with the internal flowpath 24a of the reducing agent injection device 24, and the second flowpath F2 and the third flowpath F3 that branch off from the first flowpath F1. The branching point FP where the first flowpath F1 branches into the second flowpath F2 and the third flowpath F3 is positioned higher than the reducing agent injection device 24. The third flowpath F3 extends higher than the second flowpath F2 from the branching point FP.

Therefore, water vapor generated in the internal flowpath 24a of the reducing agent injection device 24 after the engine 10 has stopped is exhausted from the first flowpath F1 to the third flowpath F3 whereby the water vapor can be suppressed from staying in the first flowpath F1 or in the internal flowpath 24a of the reducing agent injection device 24. As a result, the replenishment performance of the cooling water to the reducing agent injection device 24 can be improved because the cooling water can be supplied smoothly from the second flowpath F2 through the first flowpath F1 into the internal flowpath 24a of the reducing agent injection device 24.

(2) Both the second flowpath F2 and the third flowpath F3 are connected to the storage tank 29.

As a result, the cooling water that is stored in the storage tank 29 while the engine 10 is driving can be supplied to the reducing agent injection device 24 after the engine 10 has stopped. Therefore, the supply amount of the cooling water to the reducing agent injection device 24 after the engine 10 has stopped can be increased.

(3) The second flowpath F2 extends upward from the branching point FP. As a result, the cooling water stored in the storage tank 29 is able to flow smoothly from the second flowpath F2 to the first flowpath F1 due to the self-weight of the cooling water.

(4) The third flowpath F3 is connected to the storage tank 29 at a position higher than the second flowpath F2.

As a result, the cooling water is made to flow from the storage tank 29 to the second flowpath F2 while the water vapor generated in the internal flowpath 24a of the reducing agent injection device 24 is discharged from the third flowpath F3 to the storage tank 29. Therefore, the cooling water can be made to flow smoothly from the second flowpath F2 while suppressing the reverse flow of the cooling water toward the third flowpath F3.

(5) The fourth flowpath F4 is connected to the storage tank 29 at a position higher than the middle of the storage tank 29 in the vertical direction.

As a result, a greater amount of the cooling water can be stored in the storage tank 29 in comparison to when the fourth flowpath F4 is connected at a position lower than the middle of the storage tank 29.

(6) The first flowpath F1 is shorter than the third flowpath F3. Therefore, water vapor generated in the internal flowpath 24a of the reducing agent injection device 24 can be exhausted smoothly from the third flowpath F3 because the flowpath length of the first flowpath F1 can be made relatively smaller.

(7) The second flowpath F2 is thicker than the third flowpath F3. Therefore, the amount of cooling water supplied to the reducing agent injection device 24 after the engine 10 has stopped can be increased because a larger amount of the cooling water can remain in the second flowpath F2 when the engine 10 has stopped.

Other Embodiments

While the above embodiment includes a configuration in which the "branched pipe" uses the branching block 30 and includes the first branch connection part 41, the second branch connection part 42, the third branch connection part 43, and the first internal flowpath 40a, the "branched pipe" is not limited in this way. A well-known trifurcated branched pipe may be used for the "branched pipe."

While the first internal flowpath 40a and the second internal flowpath 40b are formed inside the branching block 30 in the above embodiment, the present invention is not limited in this way. Only the first internal flowpath 40a may be formed inside the branching block 30. In this case, one pipe may be used which combines the fifth pipe 35 and the sixth pipe 36. Moreover, only the second internal flowpath 40b may be formed inside the branching block 30. In this case, a trifurcated branched pipe connected to the first to third connecting pipes 31 to 33 may be used separately.

Figure 8:
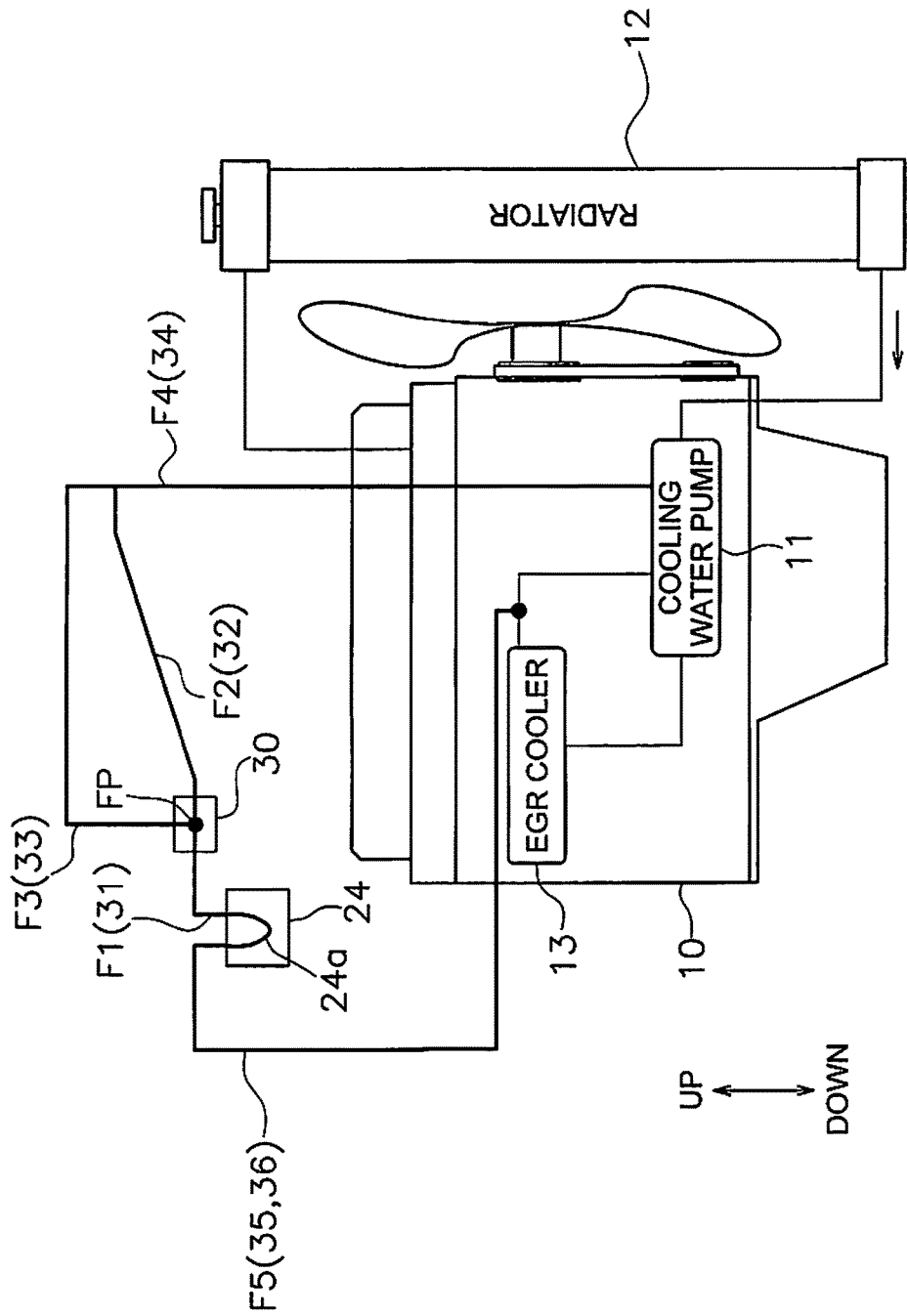
FIG. 8 is a schematic view of another embodiment of a cooling water path.

While the cooling water path 25 is provided with the storage tank 29 in the above embodiment, the storage tank 29 may not be provided as illustrated in FIG. 8. In this case, the cooling water remaining inside the second flowpath F2 and the third flowpath F3 when the engine 10 has stopped is used for cooling the reducing agent injection device 24. Even in this case, the water vapor generated in the internal flowpath 24a of the reducing agent injection device 24 can be exhausted from the first flowpath F1 to the third flowpath F3.

While the exhaust gas aftertreatment unit 20 is provided with the diesel particulate filtering device 21 in the above embodiment, the exhaust gas aftertreatment unit 20 is not limited in this way. The exhaust gas aftertreatment unit 20 may be provided with a diesel oxidation catalyst (DOC) in place of the diesel particulate filtering device 21. The diesel oxidation catalyst has a function for reducing nitrogen monoxides (NO) and increasing nitrogen dioxides ($NO_2$) among the nitrogen oxides (NOx) in the exhaust gas.

While the third flowpath F3 extends upward from the branching point FP higher than the second flowpath F2 in the above embodiment, a portion of the third flowpath F3 may be positioned at the same height as the second flowpath F2 and a portion may be positioned at a position higher than the second flowpath F2.

What is claimed is:

1. An exhaust gas aftertreatment unit comprising:
   a selective catalytic reduction device configured to treat exhaust gas from an engine;
   a connecting pipe configured to guide the exhaust gas from the engine to the selective catalytic reduction device;
   a reducing agent injection device disposed on the connecting pipe and configured to inject a reducing agent into the exhaust gas supplied to the selective catalytic reduction device; and
   a cooling water flowpath configured to guide cooling water useable to cool the reducing agent injection device to the reducing agent injection device,
   the reducing agent injection device having an internal flowpath through which the cooling water flows, and
   the cooling water path including
      a first flowpath joined with the internal flowpath of the reducing agent injection device,
      a second flowpath and a third flowpath branching off from the first flowpath, and
      a branching point where the first flowpath branches into the second flowpath and the third flowpath is positioned higher than a connecting portion of the reducing agent injection device and the first flowpath,
      the third flowpath extending further upward than the second flowpath from the branching point, and
      the second flowpath and the third flowpath merging on an opposite side of the branching point.

2. The exhaust gas aftertreatment unit according to claim 1, wherein
   the first flowpath is shorter than the third flowpath.

3. The exhaust gas aftertreatment unit according to claim 1, wherein
   the second flowpath is thicker than the third flowpath.

4. The exhaust gas aftertreatment unit according to claim 1, wherein
   the cooling water path has a tank configured to temporarily store cooling water, and
   the second flowpath and the third flowpath are connected to the tank.

5. The exhaust gas aftertreatment unit according to claim 4, wherein
   the second flowpath extends upward from the branching point.

6. The exhaust gas aftertreatment unit according to claim 4, wherein
   the third flowpath is connected to the tank at a position higher than the second flowpath.

7. The exhaust gas aftertreatment unit according to claim 4, wherein
   the cooling water path has a fourth flowpath connected to the tank and to a cooling water pump, and
   the fourth flowpath is connected to the tank at a position higher than a middle of the tank in a vertical direction.

8. A work vehicle including the exhaust gas aftertreatment unit according to claim 1, the work vehicle further comprising:
   a work implement; and
   an engine.

* * * * *